United States Patent
Yang et al.

(10) Patent No.: US 9,515,556 B2
(45) Date of Patent: Dec. 6, 2016

(54) CURRENT PULSE COUNT CONTROL IN A VOLTAGE REGULATOR

(71) Applicant: INTERSIL AMERICAS LLC, Milpitas, CA (US)

(72) Inventors: Xiping Yang, McKinney, TX (US); Sisan Shen, Plano, TX (US); Congzhong Huang, Plano, TX (US)

(73) Assignee: Intersil Americas LLC, Milpitas, CA (US)

( * ) Notice: Subject to any disclaimer, the term of this patent is extended or adjusted under 35 U.S.C. 154(b) by 109 days.

(21) Appl. No.: 14/543,047

(22) Filed: Nov. 17, 2014

(65) Prior Publication Data
US 2015/0311795 A1    Oct. 29, 2015

Related U.S. Application Data

(60) Provisional application No. 61/984,962, filed on Apr. 28, 2014, provisional application No. 62/066,519, filed on Oct. 21, 2014.

(51) Int. Cl.
*H02M 3/156* (2006.01)
*H02M 3/158* (2006.01)
*H02M 1/00* (2006.01)

(52) U.S. Cl.
CPC .......... *H02M 3/1582* (2013.01); *H02M 3/156* (2013.01); *H02M 2001/0035* (2013.01); *Y02B 70/16* (2013.01)

(58) Field of Classification Search
CPC ............. H02M 2001/0035; H02M 3/156; H02M 3/1582; H02M 3/10; H02M 3/158; H03K 21/38
USPC ................................. 323/282–285
See application file for complete search history.

(56) References Cited

U.S. PATENT DOCUMENTS

| | | | |
|---|---|---|---|
| 8,283,907 B1 | 10/2012 | Jayaraj | |
| 8,289,732 B2 | 10/2012 | Li et al. | |
| 8,750,002 B2 * | 6/2014 | Duvnjak | H02M 3/33523 363/21.01 |
| 8,866,462 B2 * | 10/2014 | Luo et al. | H02M 3/158 323/283 |
| 9,209,702 B2 * | 12/2015 | Ren et al. | H02M 3/33553 |

(Continued)

FOREIGN PATENT DOCUMENTS

CN    103312163    9/2013

OTHER PUBLICATIONS

Chen et al., "A Monolithic Boost Converter with an ADaptable Current-Limited PFM Scheme", "APCCAS 2006", 2006, pp. 662-665, Published in: TW.

*Primary Examiner* — Gary L Laxton
*Assistant Examiner* — Kyle J Moody
(74) *Attorney, Agent, or Firm* — Fogg & Powers LLC

(57) ABSTRACT

A method of regulating voltage with a switching regulator is disclosed. The method includes sensing an output voltage provided by the regulator. If the output voltage drops below a low voltage threshold, a burst of one or more current pulses is provided. If the output voltage raises above a high voltage threshold during the burst, discontinuing the burst of current pulses. The method includes counting a number of the one or more current pulses in the burst, and comparing the number of the one or more current pulses with at least one pulse threshold. The upper current threshold is adjusted based on the number of the one or more current pulses.

28 Claims, 6 Drawing Sheets

(56) References Cited

U.S. PATENT DOCUMENTS

2013/0033902 A1 2/2013 Zhang
2013/0051089 A1 2/2013 Pan et al.

* cited by examiner

CURRENT PULSE COUNT CONTROL IN A VOLTAGE REGULATOR

CROSS-REFERENCE TO RELATED APPLICATIONS

This application claims the benefit of priority to U.S. Provisional Application No. 61/984,962, filed on Apr. 28, 2014, and to U.S. Provisional Application No. 62/066,519, filed on Oct. 21, 2014, both of which are hereby incorporated herein by reference.

DETAILED DESCRIPTION

Figure 1:
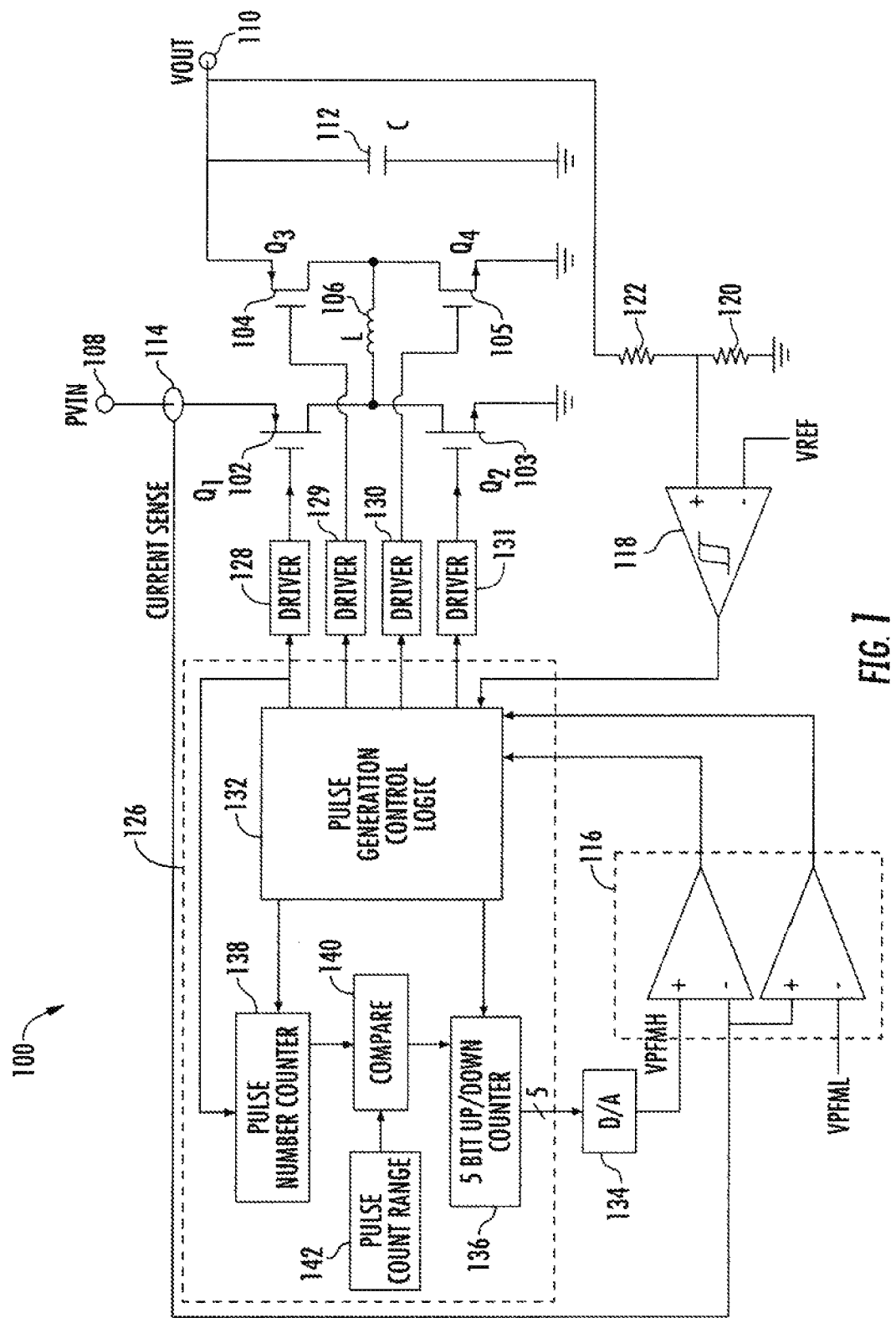
FIG. 1 is block diagram of an example voltage regulator configured to provide a regulator output voltage by providing bursts of current pulses and control the number of current pulses in each burst.

FIG. 1 is a block diagram of an example voltage regulator 100 configured to provide a regulated output voltage from an input voltage. The regulator 100 is a switching regulator and accordingly includes a plurality of transistors 102-105 for generating the output voltage. In the example shown in FIG. 1, the regulator 100 has a buck-boost topology, such that the regulator 100 can be configured in a buck converter mode or a boost converter mode. In some examples, the regulator 100 can also be configured into other modes such as auto-bypass mode. In addition to the transistors 102-105, the regulator 100 includes an inductor 106 coupled in series between an input 108 to the regulator 100 and an output 110. A capacitor 112 can be coupled in parallel with the output 110. As known by those skilled in the art, the transistors 102-105 can be controlled to charge the inductor 106 with current from the input 108 and discharge the inductor 106 to provide current to a load coupled to the output 110. The transistors can be controlled by setting each transistor 102-105 to a conductive or non-conductive state respectively.

The regulator 100 also includes a current sensor 114 configured to sense a current propagating through the inductor 106, and to output a signal indicative of that inductor current. In an example, the signal indicative of the inductor current is a DC voltage. A first comparator 116 is coupled to the current sensor 114, configured to receive the output from the current sensor, and to compare the indication of the inductor current with an upper current threshold and a lower current threshold. In the example shown in FIG. 1, the comparator 116 compares the voltage output by the current sensor 114 with a voltage (VPFMH) corresponding to the upper current threshold, and compares the voltage output by the current sensor 114 with a voltage (VPFML) corresponding to a lower current threshold. The first comparator 116 can output a first signal (e.g., a voltage) indicative of whether the inductor current is below or above the upper current threshold and can output a second signal indicative of whether the inductor current is below or above the lower current threshold.

The regulator 100 also includes a second comparator 118 configured to compare a feedback voltage ($V_{FB}$), which corresponds to a voltage at the output 110 (also referred to herein as the "output voltage") of the regulator 100, with a reference voltage ($V_{ref}$). A plurality of resistors 120, 122 can be used to generate the feedback voltage. The second comparator 118 and the resistors 120, 122 are configured such that the second comparator 118 outputs a first digital value (e.g., a "0") when the output voltage is lower than a low voltage threshold, and outputs a second digital value (e.g., a "1") when the output voltage is higher than a high voltage threshold. The low voltage threshold and high voltage threshold correspond to the desired output voltage range for the regulator 100. In an example, the low voltage threshold is a desired output voltage level multiplied by a nominal voltage, and the high voltage threshold is 1.015 multiplied by the desired output voltage level multiplied by the nominal voltage.

The regulator 100 also includes a digital circuit 126 configured to control the transistors 102-105 based on the output from the first comparator 116 and the second comparator 118 to generate the output voltage. The digital circuit 126 can control the transistors 102-105 by sending a respective signal to a respective driver 128-131 for each transistor 102-105. The digital circuit 126 can be implemented as any appropriate digital component(s) including one or more discrete components, programmable components (e.g., an FPGA), or processing devices (e.g., a microprocessor) having an associated storage medium with corresponding instructions for the processing device(s).

In operation, the voltage regulator 100 is configured to maintain the output voltage substantially between the low voltage threshold and the high voltage threshold. In particular, as a load coupled to the output 110 draws power from the output 110, the output voltage will drop. If the output voltage drops below the low voltage threshold, the voltage regulator 100 provides additional power from the input 108 to the output 110 to raise the output voltage.

The voltage regulator 100 is configured to provide power to the output in one or more current pulses. An individual current pulse, as used herein, includes a period in which the voltage regulator 100 is in a charge state followed by a period in which the voltage regulator is in a discharge state. During the charge state, the voltage regulator 100 controls the transistors 102-105 such that a current through the inductor 106 (also referred to herein as the "inductor current") increases, thereby "charging" the inductor 106. During the discharge state, the regulator 100 controls the transistors 102-105 such that inductor current decreases, thereby "discharging" the inductor 106. Depending on the mode (i.e., buck or boost) of the regulator 100, the inductor current during one or both of the charge and discharge states is provided to the output 110 to raise the output voltage. The regulator 100 is configured to switch from the charge state to the discharge state based on the inductor current. In particular, while the regulator 100 is in the charge state, the digital circuit 126 is configured to determine based on the output from the comparator 116 whether the inductor current is above an upper current threshold. If the inductor current is above the upper current threshold, the digital circuit 126 sets the regulator 100 into the discharge state. Accordingly, the regulator 100 remains in the charge state until the inductor current reaches the upper current threshold, at which point the regulator 100 is switched into the discharge state. In some examples, the transistors 102-105 are switched from the charge state to the discharge state in a break-before-make manner to reduce the possibility of shoot-through.

Once in the discharge state, the regulator 100 is switched from the discharge state at the end of the current pulse. At the end of the current pulse, either another pulse begins (i.e., the voltage regulator 100 is set back to the charge state), or the voltage regulator 100 is set to an idle state, where no current is provided to the load. In the idle state, the regulator 100 controls the transistors 102-105 such that the inductor current is substantially zero, and no power is provided to the output 110.

The regulator 100 is configured to provide enough current pulses to the output 110 to raise the output voltage from the low voltage threshold to the high voltage threshold. Accordingly, the regulator 100 provides one or more pulses until the output voltage reaches the high voltage threshold. In particular, while the regulator 100 is providing the one or more current pulses, the digital circuit 126 is monitoring whether the output voltage based on the signal from the comparator 118. If the output voltage raises above the high voltage threshold during the present pulse, the digital circuit 126 discontinues the current pulses and sets the regulator 100 into the idle state. If the output voltage remains below the high voltage threshold until the end of the present pulse, the digital circuit 126 provides another current pulse to the output 110. Thus, the digital circuit 126 of the regulator 100 determines whether to provide another current pulse based on the output voltage. The "end" of the present pulse is determined in a different manner for different topologies/modes, and is described in more detail below.

Once pulsing has been discontinued and the regulator 100 is in the idle state, the regulator 100 remains in the idle state until the output voltage drops to the low voltage threshold, at which point the regulator 100 begins pulsing once again to raise the output voltage back up to the high voltage threshold. The regulator 100 continues in this manner pulsing and discontinuing pulsing to maintain the output voltage substantially between the low voltage threshold and the high voltage threshold. A given instance of the one or more consecutive pulses used to raise the output voltage from the low voltage threshold to the high voltage threshold is also referred to herein as a "burst" of current pulses.

Figure 2:
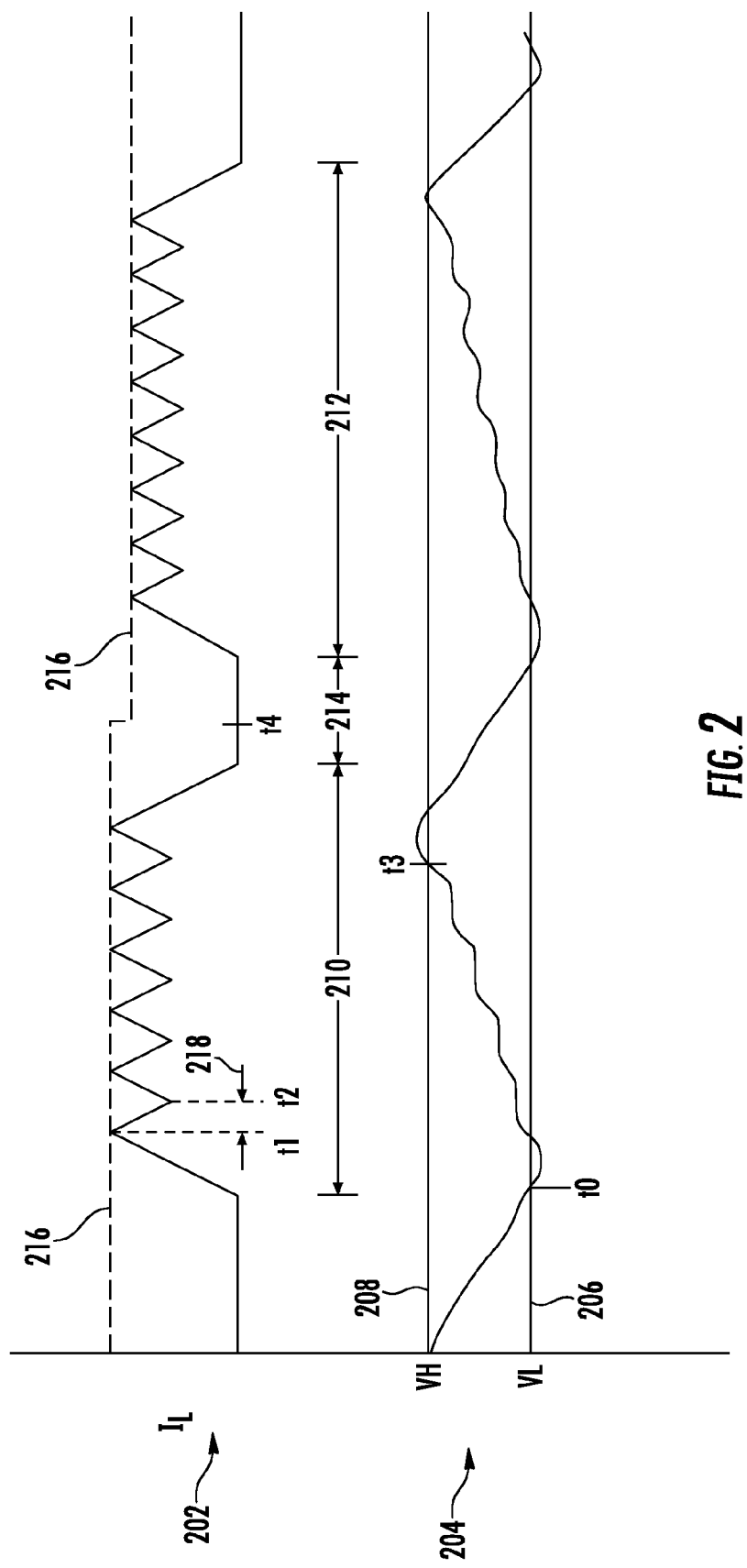
FIG. 2 is an illustration of example waveforms for an inductor current and an output voltage in a buck converter mode of the voltage regulator of FIG. 1.

FIG. 2 is a graph showing an example inductor current waveform 202 aligned with an example output voltage waveform 204 for a buck converter mode of the regulator 100. The inductor current waveform 202 of FIG. 2 includes two bursts 210, 212 of current pulses. The preceding burst 210 begins when the output voltage 204 drops to the low voltage threshold 206 at time t0. Accordingly, at time t0 the digital circuit 126 switches the regulator 100 from the idle state to the charge state to implement a current pulse and raise the output voltage. After time t0, during the charge state, the inductor current increases until the inductor current reaches the upper current threshold 216 at time t1. At time t1, the digital circuit 126 switches the regulator 100 from the charge state to the discharge state. After time t1, the inductor current decreases until the end of the pulse, at time t2. As mentioned above, the end of a current pulse can be determined in different manners based on the mode of the regulator 100. In the example shown in FIG. 1 and in the example waveforms shown in FIG. 2, the regulator 100 is in a buck converter mode. In the implementation of a buck converter mode shown in FIG. 2, the end of a current pulse can be determined by a fixed time period 218 for the discharge state. That is, the digital circuit 126 can hold the regulator 100 in the discharge state for the fixed time period 218 that starts when the regulator 100 switches from the charge state to the discharge state. As shown in waveform 202 of FIG. 2, the regulator 100 switches from the charge state to the discharge state at time t1, and the digital circuit 126 holds the regulator 100 in the discharge state for the fixed period of time 218 starting at time t1. The fixed period of time 218 ends at time t2. Accordingly, in this implementation of a buck converter mode, a current pulse can be implemented by setting and holding the regulator 100 in the charge state until the inductor current raises to the upper current threshold 216 and then setting and holding the regulator 100 in the discharge state for the fixed time period 218.

As described above, the digital circuit 126 monitors the output voltage during the current pulse to determine whether and when to discontinue providing current pulses in the burst 210. In the implementation shown in FIG. 2, if, at the end of the fixed time period for the discharge state, the output voltage is still below the high voltage threshold, another pulse is provided in the burst 210. In the example shown in waveform 202 of FIG. 2, the output voltage at time t2 (the end of the first pulse) is below the high voltage threshold 208. The output voltage rises during the first current pulse, but is still below the high voltage threshold 208. Thus, the digital circuit 126 provides another current pulse and switches from the discharge state to the charge state at time t2 to implement the another current pulse. The digital circuit 126 continues providing pulses and gradually increasing the output voltage through the preceding burst 210.

In the implementation shown in FIG. 2, if another pulse is to be provided, the digital circuit 126 proceeds directly from the discharge state of the present pulse to the charge state of the next pulse. The regulator 100 does not enter the idle state between such pulses. Proceeding directly from the discharge state to the charge state can include switching the transistors 102-105 in a break-before-make manner to reduce the possibility of shoot-through. Such a break-before-make switching is different than the idle state of the regulator 100. In particular, even if a short dead-time is implemented in the break-before-make switch, the determination of when to set the regulator 100 to the charge state in a break-before-make switch is based on timing to implement the dead-time (typically a short, defined, delay period). In contrast, in the idle state, the determination of when to begin the next pulse, (and consequently when to set the regulator 100 to the charge state) is based on some other factor such as the output voltage dropping to the low voltage threshold or a defined delay period longer than necessary to implement a dead-time.

During the sixth pulse of the burst 210, the output voltage raises above the high voltage threshold 208, at which point the digital circuit 126 discontinues pulsing. The digital circuit 126 discontinues pulsing by discharging the inductor 106, and once the inductor 106 is substantially discharged, setting the regulator 100 into the idle state 214. If the regulator 100 is in the charge state when the digital circuit 126 determines that the output voltage has risen above the high voltage threshold 208, the digital circuit 126 can interrupt the present pulse by immediately switching the regulator 100 from the charge state to the discharge state. If the regulator 100 is in the discharge state when the digital circuit 126 determines that the output voltage has risen above the high voltage threshold 208, the digital circuit 126 can maintain the regulator 100 in the discharge state. Once the voltage regulator 100 is in the discharge state, either after being switched to the discharge state or after being maintained in the discharge state, the digital circuit 126 discontinues pulsing by holding the regulator 100 in the discharge state until the inductor current is substantially zero. The digital circuit 126 switches the regulator 100 from the discharge state to the idle state around the time when the inductor current is substantially zero. In an example, the digital circuit 126 initiates switching from the discharge state to the idle state when the inductor current is at a small positive value such as 300 milliamps. Switching when the inductor current is at a small positive value can be used to take into account the delay between the determination of when to switch, and the time in which the transistors 102-104 are actually switched to the idle state, such that the transistors 102-104 are actually switched to the idle state at or near the time when the inductor current is zero.

During the idle state 214, the output voltage drops as the load draws power from the regulator 100. Once the output voltage drops to the low voltage threshold 206 at time t4, the digital circuit 126 implements another burst 212 of current pulses to raise the output voltage up to the high voltage threshold 208.

As the regulator 100 is pulsing and discontinuing pulsing to maintain the output voltage, the digital circuit 126 controls the upper current threshold in order to regulate the number of current pulses in a given burst of current pulses. Since the determination of whether to provide another pulse or to discontinue pulsing is based on the output voltage, as the load draws more power from the regulator 100, the number of current pulses in a burst would tend to increase. Conversely, as the load draws less power from the regulator 100, the number of current pulses in a burst would tend to decrease. Instead of allowing the number of pulses in a burst to increase and decrease in an unregulated manner, the regulator 100 controls the upper current threshold 216 to substantially maintain the number of current pulses in each burst to within a pulse count range. Maintaining the number of current pulses in each burst to within the pulse count range can increase efficiency for the regulator 100 by balancing switching losses of the transistors 102-105 with losses due to higher than necessary inductor current.

To control the number of pulses in a burst, the digital circuit 126 can increase and decrease the upper current threshold 216. In particular, to reduce the number of pulses in a burst as compared to previous bursts (assuming the same load draw), the digital circuit 126 can increase the upper current threshold 216 from its present position. Since the charge state (and consequently the duration) of each current pulse is based on the upper current threshold 216, increasing the upper current threshold 216 causes more power to be provided to the output 110 in a given pulse. The increase in power provided by each pulse enables the demand of the load to be satisfied in comparatively fewer pulses. Thus, the upper current threshold 216 can be increased to substantially maintain the number of pulses in each burst to at or below a high pulse threshold of the pulse count range. Similarly, to increase the number of pulses in a burst (assuming the same load draw), the digital circuit 126 can decrease the upper current threshold 216 from its present position. Decreasing the upper current threshold 216 causes less power to be provided to the output in a given pulse and causes the regulator 100 to provide comparatively more pulses to satisfy the demand of the load. Thus, the upper current threshold 216 can be decreased to substantially maintain the number of pulses in each pulse to at or above a low pulse threshold of the pulse count range.

Figure 4:
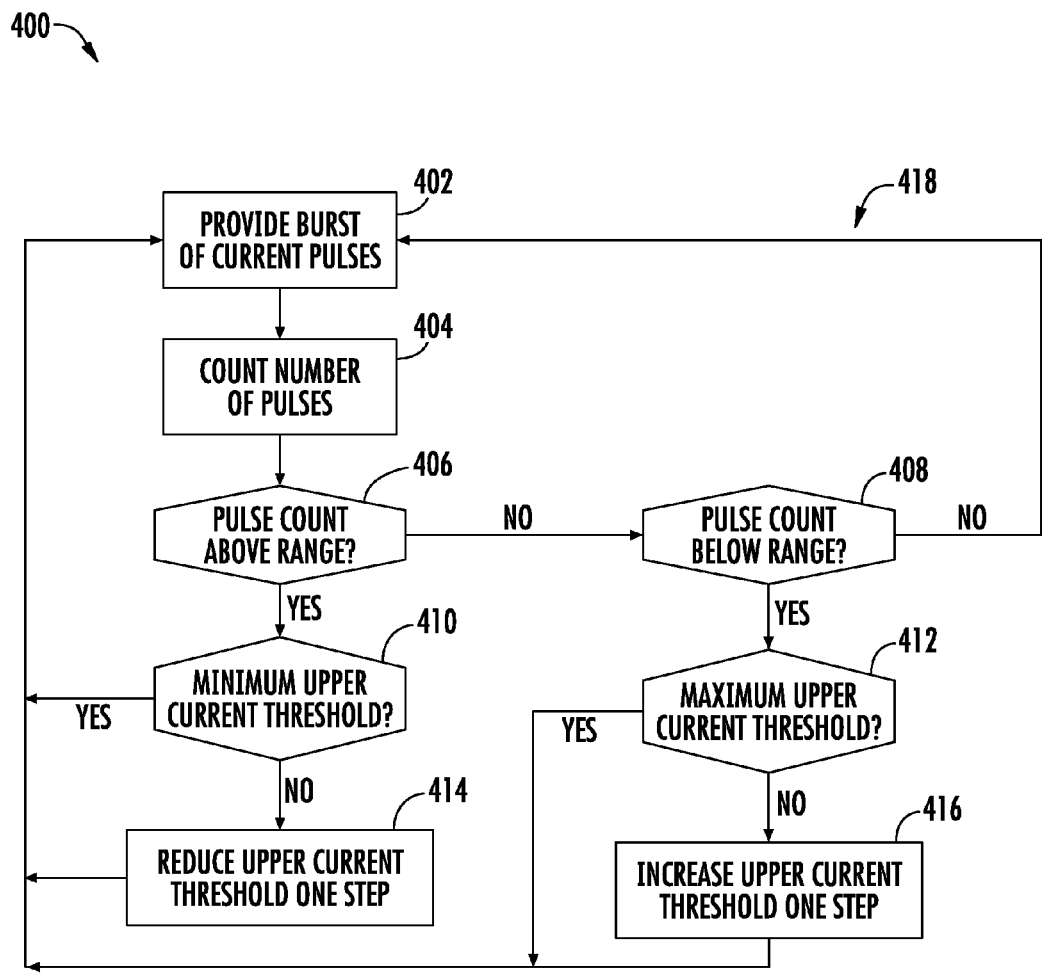
FIG. 4 is a flow diagram of an example method for controlling the number of current pulses in a burst using the voltage regulator of FIG. 1.

FIG. 4 is a flow diagram of an example method 400 for controlling the number of pulses in a burst. The digital circuit 126 can determine whether to adjust the upper current threshold 216 after the digital circuit 126 has determined not to provide any more pulses for a given burst (i.e., to enter the idle state). The digital circuit 126 can make the determination of whether to adjust the upper current threshold 216 based on the number of current pulses in the previous burst. Accordingly, a burst of current pulses is provided by the regulator 100 as described above (block 402). The number of pulses in the burst is counted as described above (block 404). If the number of current pulses in the previous burst is above the pulse count range (block 406), the digital circuit 126 can adjust the upper current threshold 216 downward (block 414) for a subsequent (e.g., the next) burst of current pulses. If the number of current pulses in the previous burst is below the pulse count range (block 408), the digital circuit 126 can adjust the upper current threshold 216 upward (block 416) for a subsequent (e.g., the next) burst of current pulses. If the number of current pulses in the previous burst is at or within the pulse count range, the digital circuit 126 can maintain the upper current threshold 216 (line 418) at the same value.

The pulse count range can be any suitable range and can be a value that provides good efficiency and performance for the regulator 100 in the intended operation environment. The pulse count range can be selected during design or initial configuration of the regulator 100. In an example, the pulse count range consists of multiple numbers demarcated by a high count threshold at the upper end of the pulse count range and a low count threshold at the lower end of the pulse count range (e.g., between and including 8-12). In an alternative example, the pulse count range consists of a single number (e.g., 10).

Referring back to FIG. 2, around time t4 the digital circuit 126 can determine whether the number of current pulses in the burst 210 was within the pulse count range for the regulator 100. Based on the result of this determination, the digital circuit 126 adjusts the upper current threshold 216 upward or downward, or maintains the upper current threshold at its present value. The digital circuit 126 makes such an adjustment prior to the start of the next burst 212. In the example shown in FIG. 2, six pulses is less than the pulse count range. Accordingly, the digital circuit 126 adjusts the upper current threshold 216 downward at time t4 as discussed above.

Figure 3:
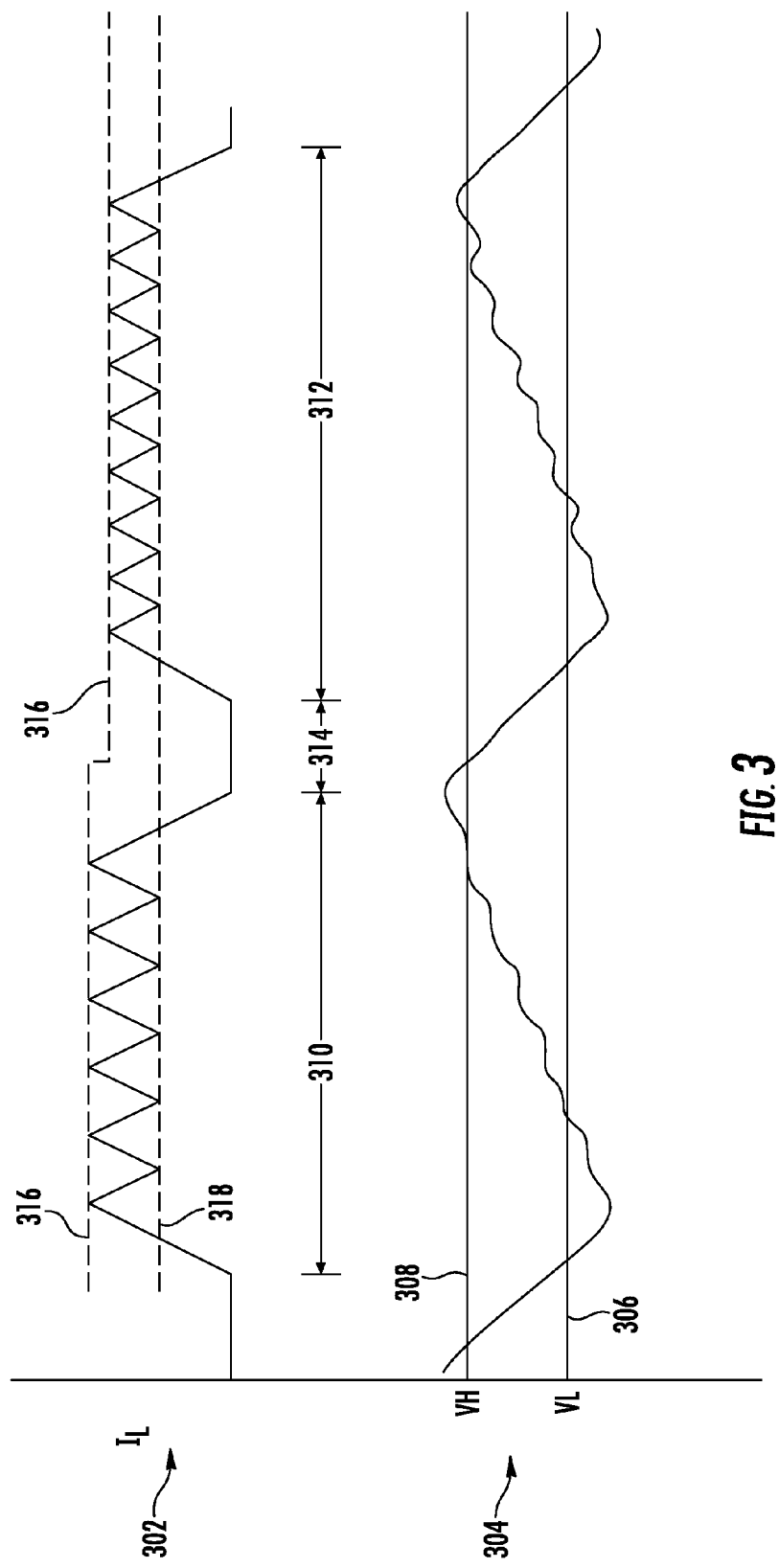
FIG. 3 is an illustration of example waveforms for an inductor current and an output voltage in a boost converter mode of the voltage regulator of FIG. 1.

FIG. 3 is a graph showing another example inductor current waveform 302 aligned with another example output voltage waveform 304. The inductor current waveform 302 and the output voltage waveform 304 are example waveforms for a boost converter mode of the regulator 100. The inductor current waveform 302 includes two bursts 310, 312 of current pulses. The preceding burst 310 begins when the output voltage 304 drops to the low voltage threshold 306. At that time, the digital circuit 126 switches the regulator 100 from the idle state to the charge state to implement a current pulse and raise the output voltage. During this charge state, the inductor current increases until the inductor current reaches the upper current threshold 316. When the inductor current reaches the upper current threshold 316, the digital circuit 126 switches the regulator 100 from the charge state to the discharge state. During the discharge state, the inductor current decreases until the end of the pulse. In a boost converter mode corresponding to FIG. 3, the end of a current pulse can be determined based on the inductor current. In particular, the end of a current pulse can be based on when the inductor current drops to a lower current threshold 318. For example, while the regulator 100 is in the discharge state, the digital circuit 126 can determine when the inductor current drops below the lower current threshold 318. The lower current threshold 318 can be selected in any suitable manner. Accordingly, in a boost converter mode, a current pulse can be implemented by setting and holding the regulator 100 in the charge state until the inductor current raises to the upper current threshold 316 and then setting and holding the regulator 100 in the discharge state until the inductor current drops to the lower current threshold 318.

During the current pulse, the digital circuit 126 monitors the output voltage to determine whether and when to discontinue providing current pulses in the burst 310. If, at the time that the inductor current does drop below the lower current threshold 318, the output voltage is still below the high voltage threshold, another pulse is provided in the burst. In the example shown in waveform 302 of FIG. 3, the output voltage at the end of the first (temporally) pulse is below the high voltage threshold 308. The output voltage rises during the first current pulse, but is still below the high voltage threshold 308. Thus, the digital circuit 126 provides another current pulse and switches from the discharge state to the charge state when the inductor current drops below the lower current threshold 318 to implement the another pulse. The digital circuit 126 continues providing pulses and gradually increasing the output voltage through the preceding burst 310.

Similar to the implementation shown in FIG. 2, in the boost converter mode example shown in FIG. 3, the digital circuit 126 proceeds directly from the discharge state of the present pulse to the charge state of the next pulse if another pulse is to be provided. The regulator 100 does not enter the idle state between such pulses. Proceeding directly from the discharge state to the charge state can include switching the transistors 102-105 in a break-before-make manner to reduce the possibility of shoot-through as discussed above with respect to FIG. 2.

During the sixth pulse of the burst 310, the output voltage raises above the high voltage threshold 308, at which point the digital circuit 126 discontinues pulsing. The digital circuit 126 discontinues pulsing by discharging the inductor 106, and once the inductor 106 is substantially discharged, setting the regulator 100 into the idle state 314. In the boost converter mode, the digital circuit 126 can discontinue pulsing the same manner as discussed above with respect to FIG. 2. In particular, if the regulator 100 is in the charge state when the digital circuit 126 determines that the output voltage has risen above the high voltage threshold 208, the digital circuit 126 can interrupt the present pulse by immediately switching the regulator 100 from the charge state to the discharge state. Once in the discharge state, either after being switched to the discharge state or after being maintained in the discharge state, the digital circuit 126 can discontinue pulsing by holding the regulator 100 in the discharge state until the inductor current is substantially zero. Once the inductor is substantially discharged, the digital circuit 126 can set the regulator 100 into the idle state as discussed above with respect to FIG. 2.

Once the digital circuit 126 has determined to discontinue pulsing for a given burst 310, the digital circuit 126 also determines whether the number of current pulses in the burst 310 was within the pulse count range for the regulator 100. Based on the result of this determination, the digital circuit 126 adjusts the upper current threshold 316 upward or downward, or maintains the upper current threshold at its present value. The digital circuit 126 makes such an adjustment prior to the start of the next burst 312. In the example shown in FIG. 3, six pulses is less than the pulse count range. Accordingly, the digital circuit 126 adjusts the upper current threshold 316 downward as discussed above. The lower current threshold 318 is not changed. During the idle state 314, the output voltage drops as the load draws power from the regulator 100. Once the output voltage drops to the low voltage threshold 306, the digital circuit 126 implements another burst 312 of current pulses to raise the output voltage up to the high voltage threshold 308.

The magnitude of the adjustment of the upper current threshold can be implemented in any suitable manner. For example, the adjustment (upward or downward) of the upper current threshold can be implemented as a fixed magnitude adjustment, such that each time the upper current threshold is adjusted, it is adjusted by the fixed magnitude. In another example, the adjustment of the upper current threshold can have a magnitude that is based on how far away the number of bursts of the previous burst is (above or below) the pulse count range. In an example, the magnitude of the adjustment is selected to be small enough to reduce ringing of the upper current threshold. For instance, a fixed magnitude adjustment can be selected to have a value that typically causes the regulator 100 to take several adjustments to get the upper current threshold to the correct value after a change in the demand of the load. In such instances, the regulator 100 may provide a number of current pulses that is outside the pulse count range for a small number of pulses until the regulator 100 stabilizes, but such outside the limit operation may be allowed in order to increase stability of the adjustment loop.

The frequency of the adjustment of the upper current threshold can also be implemented in any suitable manner. For example, the digital circuit 126 can determine after each burst of current pulses, whether to adjust the upper current threshold based on the number of current pulses in the previous burst. In another example, the determination of whether to adjust the upper current threshold can be made after every other burst of current pulses. Additionally, in some examples, more complicated adjustment schemes can be implemented.

In any case, after the upper current threshold is adjustment or maintained at its current value by the digital circuit 126, that value (adjusted or maintained) is used as the upper current threshold for determining when to switch from the charge state to the discharge state in the next burst of current pulses. That value for the upper current threshold can be used for determining whether to switch from the charge state to the discharge state in one or more of the subsequent bursts of current pulses, until another upper current threshold adjustment determination is made.

In an example, the regulator 100 provides limits on how high and low the upper current threshold can be. These limits can be based on any suitable factor including the performance parameter of the components (e.g., transistors 102-105) used in the regulator 100. Accordingly, these limits, for example, can be set during design of the regulator 100. For example, an upper limit for the upper current threshold can be selected at a value that reduces the likelihood of damage to the transistors 102-105. A lower limit for the upper current threshold can be selected at a value that corresponds to a minimum on-time for a transistor 102-105 to actually conduct current therethough. Referring back to method 400 in FIG. 4, if the digital circuit 126 determines that the number of pulses of the previous burst is less than the pulse count range (block 406) and the upper current threshold is at the lower limit (block 410), the digital circuit 126 maintains the upper current threshold at its present value. This may allow the number of current pulses in subsequent bursts to be lower than the pulse count range, such that, for example, the number of pulses in subsequent bursts drops to a single pulse. Similarly, if the digital circuit 126 determines that the number of pulses of the previous burst is greater than the pulse count range (block 408) and the upper current threshold is at the upper limit (block 412), the digital circuit 126 maintains the upper current threshold at its present value. Again, this may allow the number of current pulses in subsequent bursts to be above the pulse count range, such that, for example, the number of pulses in a subsequent burst is unlimited.

Figure 5:
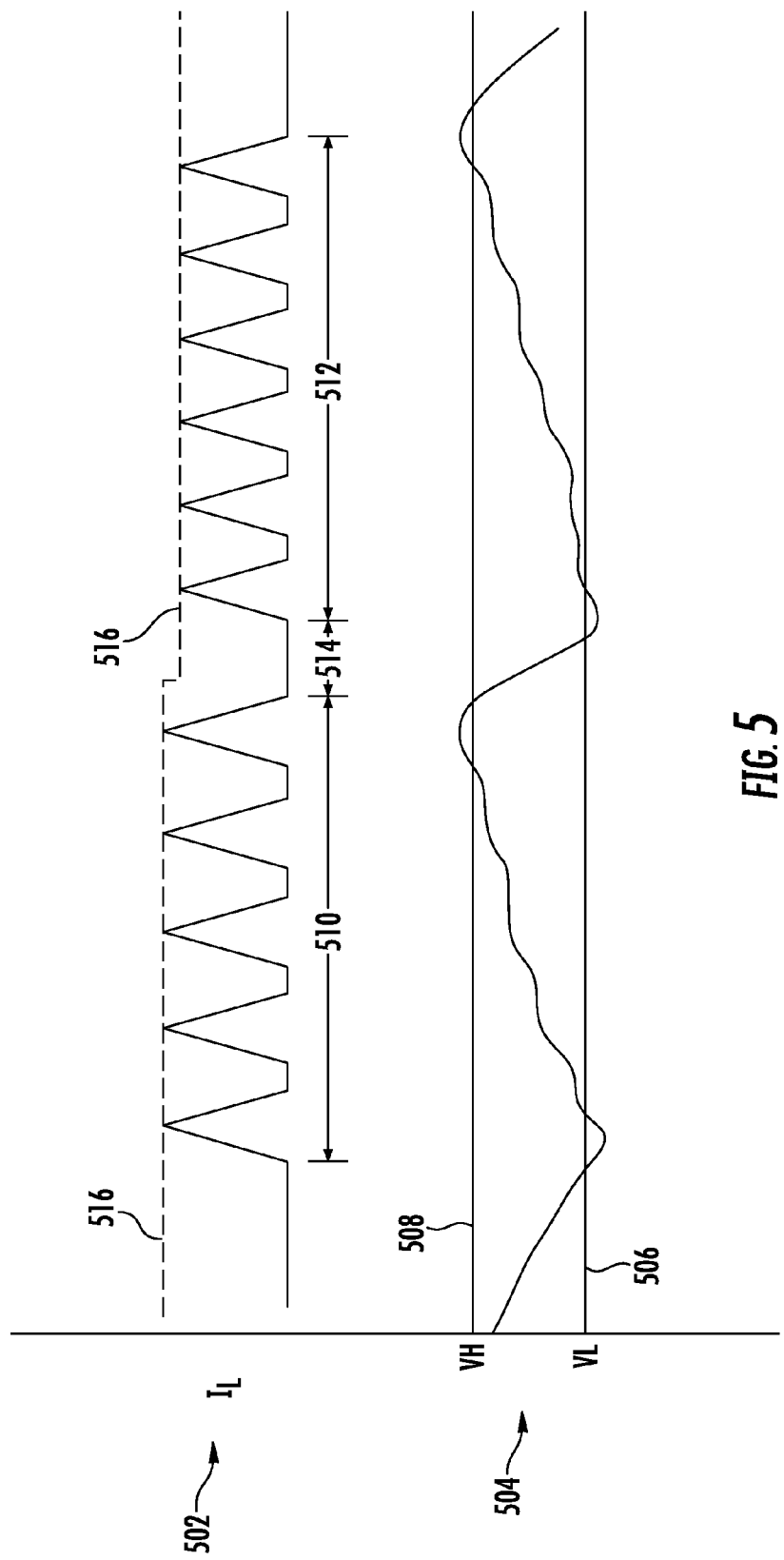
FIG. 5 is an illustration of another example waveforms for an inductor current and an output voltage in a buck converter mode of the voltage regulator of FIG. 1.

FIG. 5 is a graph of another example inductor current waveform 502 aligned with an example output voltage waveform 504 for an alternative implementation of a buck converter mode of the regulator 100. The inductor current waveform 502 includes two bursts 510, 512 of current pulses. The preceding burst 510 begins when the output voltage 504 drops to the low voltage threshold 506. At that time, the digital circuit 126 switches the regulator 100 from the idle state to the charge state to implement a current pulse and raise the output voltage. During the charge state, the inductor current increases until the inductor current reaches the upper current threshold 516. When the inductor current reaches the upper current threshold 516, the digital circuit 126 switches the regulator 100 from the charge state to the discharge state. During the discharge state, the inductor current decreases until the end of the pulse. In this alternative implementation of a buck converter mode, the end of a current pulse can be determined based on the inductor current. In particular, the end of a current pulse can be based on when the inductor current drops to zero. For example, while the regulator 100 is in the discharge state, the digital circuit 126 can determine when the inductor current drops to zero. In an example, the digital circuit 126 can make this determination based on a zero cross-point indicated by the comparator 116. In another example, the digital circuit 126 can make this determination based on a small inductor current (e.g., 300 milliamps) to factor in the time required to effectuate the switch of the transistors 102-104 as discussed above with respect to FIG. 2. Accordingly, in this alternative implementation of a buck converter mode, a current pulse can be implemented by setting and holding the regulator 100 in the charge state until the inductor current raises to the upper current threshold 516 and then setting and holding the regulator 100 in the discharge state until the inductor current drops to zero.

In this implementation of a buck converter mode, at the end of the discharge state, the digital circuit 126 switches the regulator 100 into the idle state for a period of time before another pulse would be implemented. The period of time for holding the regulator 100 into the idle state can be selected in any suitable manner. In an example, the period of time is a fixed period of time. In another example, the period of time is the time period from the end of the discharge state to the next clock cycle. In yet another example, the period of time is varied between each current pulse in the burst 510 in order to maintain a given frequency for the current pulses in the burst 510.

In any case, during the current pulse and the idle state between pulses, the digital circuit 126 monitors the output voltage to determine whether and when to discontinue providing current pulses in the burst 510. If at the end of the period of time for the idle state between pulses, the output voltage is still below the high voltage threshold, another pulse is provided in the burst 510. In the implementation shown in waveform 502, the output voltage at the end of the idle state following the first (temporally) pulse is below the high voltage threshold 508. Thus, the digital circuit 126 provides another current pulse and switches from the idle state to the charge state at the end of the period of time for the idle state between pulses to implement the another pulse. The digital circuit 126 continues providing pulses and gradually increasing the output voltage through the preceding burst 510.

During the fifth pulse of the burst 510, the output voltage raises above the high voltage threshold 508, at which point the digital circuit 126 discontinues pulsing. The digital circuit 126 discontinues pulsing by discharging the inductor 106 if it is not already discharged, and setting or maintaining the regulator 100 in the idle state. If the regulator 100 is in a charge state when the digital circuit 126 determines that the output voltage has risen above the high voltage threshold 508, the digital circuit 126 can interrupt the charge state by immediately switching the regulator 100 from the charge state to the discharge state. If the regulator 100 is in the discharge state, either after being switched to the discharge state or after being maintained in the discharge state, the digital circuit 126 can discontinue pulsing by holding the regulator 100 in the discharge state until the inductor current is zero. The digital circuit 126 can then switch the regulator 100 to the idle state. If the regulator 100 is in the idle state between pulses when the output voltage raises above the high voltage threshold, the digital circuit 126 can discontinue pulsing by maintaining the regulator 100 in the idle state.

Once the digital circuit 126 has determined to discontinue pulsing for a given burst 510, the digital circuit 126 also determines whether the number of current pulses in the burst 510 was within the pulse count range for the regulator 100. Based on the result of this determination, the digital circuit 126 adjusts the upper current threshold 516 upward or downward, or maintains the upper current threshold at its present value. The digital circuit 126 makes such an adjustment prior to the start of the next burst 512. In the implementation shown in FIG. 5, five pulses is less than the pulse count range. Accordingly, the digital circuit 126 adjusts the upper current threshold 516 downward as discussed above. During the idle state 514, the output voltage drops as the load draws power from the regulator 100. Once the output voltage drops to the low voltage threshold 506, the digital circuit 126 implements another burst 512 of current pulses to raise the output voltage up to the high voltage threshold 508.

In an example, the voltage regulator 100 can be initialized at start-up by setting the upper current threshold to its upper limit. Once the voltage regulator 100 is initialized, the upper current threshold can be adjusted as described herein to maintain to control the number of current pulses in each burst and to regulate the output voltage.

Although described above with respect to a buck-boost topology, it should be evident to those skilled in the art that the methods described above can be used in other switching regulator circuit topologies with appropriate minor adjustments. For example, the methods described above can be used with buck, boost, buck-boost, split-pi, Cuk, and SEPIC topologies/modes. In circuit topologies that enable multiple modes of operation (e.g., a buck-boost topology as described above), the regulator 100 can be configured to selectively operate in one of the multiple modes and to switch between modes as appropriate. Schemes to switch between such modes are known to those skilled in the art. Additionally, in some examples, the methods described herein can be one of multiple modes of a regulator, such that the regulator can operate as described herein in a first mode and can operate in a different manner (e.g., according to a pulse-width modulation scheme) in another mode. The determination of which mode to operate in and when to switch between such modes can be made in any suitable manner such as being based on the output voltage.

As mentioned above, the digital circuit 126 can implement the above described control scheme using any suitable electronics. FIG. 1 illustrates an example of such electronics. As shown, the digital circuit 126 includes pulse generation control logic 132 which includes the control logic to control the transistors 102-105 in order to generate a pulse in buck mode and boost mode. As known to those skilled in the art, the control logic 132 can set regulator 100 into the idle state by setting all of the transistors 102-105 to a non-conductive state. The idle state is the same regardless of whether the regulator 100 in the buck mode or boost mode. In the buck mode, the control logic 132 can set the regulator 100 into the charge state by setting the transistor 102 to a conductive state, setting the transistor 103 to a non-conductive state, setting the transistor 104 to a conductive state, and setting the transistor 105 to a non-conductive state. Also in the buck mode, the control logic 132 can set the regulator 100 into the discharge state by setting the transistor 102 to a non-conductive state, setting the transistor 103 to a conductive state, setting the transistor 104 to a conductive state, and setting the transistor 105 to a non-conductive state. In the boost mode, the control logic 132 can set the regulator 100 into the charge state by setting the transistor 102 to a conductive state, setting the transistor 103 to a non-conductive state, setting the transistor 104 to a non-conductive state, and setting the transistor 105 to a conductive state. Also in the boost mode, the control logic 132 can set the regulator 100 into the discharge state by setting the transistor 102 to a conductive state, setting the transistor 103 to a non-conductive state, setting the transistor 104 to a conductive state, and setting the transistor 105 to a non-conductive state.

The pulse generation control logic 132 determines when to implement a burst of current pulses based on a signal from the comparator 118 as discussed above. In particular, when the signal from the comparator 118 indicates that the output voltage has dropped below the low voltage threshold, the control logic 132 implements a burst of current pulses. After each current pulse, the control logic 132 also determines whether to provide another pulse or to discontinuing pulsing based on the signal from the comparator 118. In particular, the control logic 132 continues providing additional pulses until the signal from the comparator 118 indicates that the output voltage has risen above the high voltage threshold.

The pulse generation control logic 132 also determines when to switch from the charge state to the discharge state in each pulse based on a first signal from the comparator 116. In particular, when the signal from the comparator 116 indicates that the inductor current has risen above the upper current threshold, the control logic 132 can switch from the charge state to the discharge state. In the implementation of a buck converter mode discussed with respect to FIG. 2, the control logic 132 can then implement a timer for the fixed time period to determine when to switch from the discharge state as discussed above. In a boost converter mode, the control logic 132 can determine when to switch from the from the discharge state based on a second signal from the comparator 116 that indicates whether the inductor current has dropped below the lower current threshold. In the alternative implementation of the buck converter mode discussed with respect to FIG. 5, the control logic 132 can determine when to switch from the discharge state based on a second signal from the comparator 116 that indicates whether the inductor current has reached zero, or in some implementations, when the inductor current is substantially small as discussed above.

To determine whether the inductor current is above the upper current threshold, the comparator 116 can compare the signal from the current sensor 114 to a voltage reference (VPFMH) corresponding to the upper current threshold. The voltage reference (VPFMH) corresponding to the upper current threshold can be generated by converting a digital value for the voltage reference (VPFMH) to an analog voltage with a digital to analog converter 134. The digital value for the voltage reference (VPFMH) can be stored within the digital circuit 126 in any suitable manner. In an example, the digital value can be stored in a 5-bit up/down counter 136.

A pulse number counter 138 can be used to count the number of pulses in a given burst. The pulse number counter 138 can be coupled to one or more of the signal lines from the control logic 132 to the drivers 128-131. The pulse number counter 138 can be configured to sense the signals from the control logic 132 to the driver(s) 128-131 and to identify therefrom each pulse in the burst. At the end of the burst, the control logic 132 can send a signal to the counter 138 such that the counter 138 provides a value corresponding to the number of pulses in the burst to a comparator 140. The comparator 14 can compare the value from the counter 138 to a pulse count range 142. Based on whether the value from the counter 138 is below, within, or above, the pulse count range 142, the control logic 132 can increase or decrease the upper current threshold by incrementing or decrementing the counter 136 accordingly. The control logic 132 can maintain the upper current threshold at its present value by leaving the counter 136 unchanged.

Figure 6:
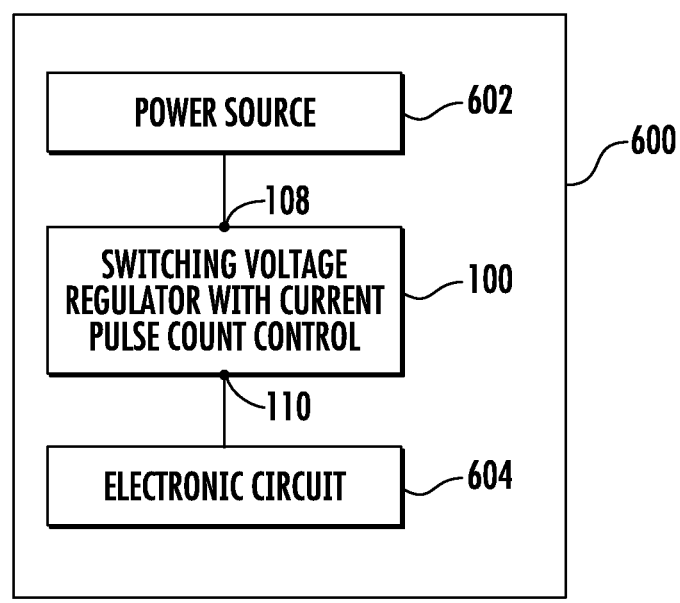
FIG. 6 is a block diagram of an example system including the voltage regulator of FIG. 1.

FIG. 6 is a block diagram of an example system 600 including the voltage regulator 100. The system 600 includes a power source 602, which is coupled to the input 108 of the voltage regulator 100 to provide power thereto. The power source 602 can be any appropriate power source such as a battery or line voltage. The voltage regulator 100 draws power from the power source 602 and provides regulated output power at the output 110. An electronic circuit 604 is coupled to the output 110 of the voltage regulator 100 and draws power from the voltage regulator 100. In an example, the system 600 is a mobile phone, and the electronic circuit 604 includes one or more processing devices, a display/touch screen, a speaker, a radio frequency transceiver, and other components.

In operation, the voltage regulator 100 is configured to determine when power is demanded by the electric circuit 604 based on the output voltage as discussed above, and to provide power to the output 110 in order to maintain the output voltage within a desired range as discussed above.

Example Embodiments

Example 1 includes a method of regulating voltage with a switching regulator, the method comprising: sensing an output voltage provided by the regulator; if the output voltage drops below a low voltage threshold, providing a burst of one or more current pulses to raise the output voltage, wherein providing each current pulse in the burst includes: setting the voltage regulator to a charge state; and if a current through an inductor reaches an upper current threshold while the regulator is in the charge state, switching the regulator from the charge state to a discharge state; if the output voltage raises above a high voltage threshold during the burst, discontinuing the burst of current pulses; counting a number of the one or more current pulses in the burst; comparing the number of the one or more current pulses with at least one pulse threshold; and adjusting the upper current threshold based on the number of the one or more current pulses.

Example 2 includes the method of Example 1, wherein providing each current pulse in the burst includes, after switching the regulator to the discharge state, holding the regulator in the discharge state for a fixed period of time; wherein providing the burst of one or more current pulses includes, if the output voltage is less than the high voltage threshold at an end of the fixed period of time, providing another current pulse in the burst; and wherein discontinuing the burst of current pulses includes, if the output voltage is higher than the high voltage threshold at the end of the fixed period of time, discontinuing the burst by switching the regulator from the discharge state to an idle state.

Example 3 includes the method of Example 1, wherein providing each current pulse in the burst includes, after switching the regulator to the discharge state, holding the regulator in the discharge state until the current through the inductor reaches a lower current threshold; wherein providing the burst of one or more current pulses includes, if the output voltage is less than the high voltage threshold when the current through the inductor reaches the lower current threshold, providing another current pulse in the burst; and wherein discontinuing the burst of current pulses includes, if the output voltage is higher than the high voltage threshold when the current through the inductor reaches the lower current threshold, discontinuing the burst by switching the regulator from the discharge state to an idle state.

Example 4 includes the method of any of Examples 1-3, wherein setting the regulator to the charge state includes setting one or more transistors into conductive or non-conductive states respectively, such that the current through the inductor increases, and wherein switching the regulator from the charge state to the discharge state includes setting the one or more transistors into conductive or non-conductive states respectively, such that the current through the inductor decreases.

Example 5 includes the method of any of Examples 1-4, wherein switching the regulator from the discharge state to an idle state includes setting the one or more transistors into conductive or non-conductive states respectively such that the current through the inductor is substantially zero.

Example 6 includes the method of any of Examples 1-5, wherein the at least one threshold includes a single threshold, wherein adjusting the upper current threshold includes: if the number of the one or more current pulses is less than the single threshold, reducing the upper current threshold; and if the number of the one or more current pulses is greater than the single threshold, increasing the upper current threshold; wherein if the number of the one or more current pulses is equal to the single threshold, maintaining the upper current threshold.

Example 7 includes the method of any of Examples 1-5, wherein the at least one threshold includes a low pulse threshold and a high pulse threshold, wherein adjusting the upper current threshold includes: if the number of the one or more current pulses is less than a low pulse threshold, reducing the upper current threshold; and if the number of the one or more current pulses is greater than a high pulse threshold, increasing the upper current threshold; wherein if the number of the one or more current pulses is equal to or between the low pulse threshold and the high pulse threshold, maintaining the upper current threshold.

Example 8 includes the method of any of Examples 1-5, wherein the at least one threshold includes a low pulse threshold and a high pulse threshold, wherein adjusting the upper current threshold includes: if the number of the one or more current pulses is less than a low pulse threshold and the upper current threshold is above a lower limit, reducing the upper current threshold; and if the number of the one or more current pulses is greater than a high pulse threshold and the upper current threshold is below an upper limit, increasing the upper current threshold; wherein if the number of the one or more current pulses is less than a low pulse threshold and the upper current threshold is at the lower limit, maintaining the upper current threshold at the lower limit; and wherein if the number of the one or more current pulses is greater than a high pulse threshold and the upper current threshold is at the upper limit, maintaining the upper current threshold at the upper limit; wherein if the number of the one or more current pulses is equal to or between the low pulse threshold and the high pulse threshold, maintaining the upper current threshold.

Example 9 includes the method of Example 8, wherein the upper current threshold is based on a digital value such that raising the upper current threshold includes increasing the digital value and lowering the upper current threshold includes decreasing the digital value.

Example 10 includes an integrated circuit chip for providing a regulated voltage at an output by charging and discharging an inductor, the integrated circuit chip comprising: a first comparator configured to: indicate if the voltage at the output is above a high voltage threshold; and indicate if the voltage at the output is below a low voltage threshold; a current sensor configured to sense a current propagating through the inductor; a second comparator configured to indicate based on a signal from the current sensor, if the current propagating through the inductor is above an upper current threshold; a digital circuit configured to: determine based on an output from the first comparator, if the output voltage drops below a low voltage threshold; if the output voltage drops below the low voltage threshold, provide a burst of current pulses to raise the output voltage; provide to the second comparator, a digital value corresponding to the upper current threshold; during the burst of current pulses, determine based on an output from the second comparator, if the current through the inductor raises above the upper current threshold; provide each current pulse in the burst by: setting the regulator to a charge state; if the current through the inductor raises above the upper current threshold during the charge state, setting the regulator to a discharge state; during the burst of current pulses, determine based on an output from the first comparator, if the output voltage raises above a high voltage threshold; if the output voltage raises above the high voltage threshold, discontinue the burst; count a number of current pulses in the burst; compare the number of current pulses to at least one pulse count threshold; and adjust the upper current threshold based on the number of current pulses.

Example 11 includes the integrated circuit chip of claim 10, comprising a digital to analog converter configured to convert the digital value to a voltage, wherein the second comparator is configured to compare the voltage to a voltage from the current sensor, wherein the voltage from the current sensor corresponds to the current through the inductor.

Example 12 includes the integrated circuit chip of any of Examples 10-11, wherein the digital circuit is configured to: monitor a length of time that the regulator is in the discharge state; if the output voltage is less than the high voltage threshold at an end of a fixed period of time, provide another current pulse in the burst; wherein discontinue the burst of current pulses includes discontinue the burst if the output voltage is higher than the high voltage threshold at an end of the fixed period of time.

Example 13 includes the voltage regulator of any of Examples 10-11, wherein the digital circuit is configured to: determine if the current through the inductor reaches a lower current threshold during the discharge state; if the output voltage is less than the high voltage threshold when the current through the inductor reaches the lower current threshold, provide another current pulse in the burst; wherein discontinue the burst of current pulses includes discontinue the burst if the output voltage is higher than the high voltage threshold when the current through the inductor reaches the lower current threshold.

Example 14 includes the integrated circuit chip of any of Examples 10-13, wherein setting the regulator to a charge state includes setting one or more transistors into conductive or non-conductive states respectively such that the current through the inductor increases, wherein setting the regulator to a discharge state includes setting the one or more transistors into conductive or non-conductive states respectively such that the current through the inductor decreases.

Example 15 includes the integrated circuit chip of any of Examples 10-14, wherein the at least one pulse count threshold consists of a single threshold, wherein adjust the upper current threshold includes: if the number of current pulses is less than the single threshold, reduce the digital value corresponding to the upper current threshold; and if the number of current pulses is greater than the single threshold, increase the digital value corresponding to the upper current threshold, wherein if the number of current pulses is equal to the single threshold, the digital circuit is configured to maintain the digital value corresponding to the upper current threshold.

Example 16 includes the integrated circuit chip of any of Examples 10-14, wherein the at least one pulse count threshold includes a low pulse threshold and a high pulse threshold, wherein adjust the upper current threshold includes: if the number of current pulses is less than the low pulse threshold, reduce the digital value corresponding to the upper current threshold; and if the number of current pulses is greater than the high pulse threshold, increase the digital value corresponding to the upper current threshold, wherein if the number of current pulses is equal to or between the low pulse threshold and the high pulse threshold, the digital circuit is configured to maintain the digital value corresponding to the upper current threshold.

Example 17 includes the integrated circuit chip of any of Examples 10-14, wherein the at least one pulse count threshold includes a low pulse threshold and a high pulse threshold, wherein adjust the upper current threshold includes: if the number of current pulses is less than the low pulse threshold and the digital value is above a lower limit, reduce the digital value corresponding to the upper current threshold; and if the number of current pulses is greater than the high pulse threshold and the digital value is below an upper limit, increase the digital value corresponding to the upper current threshold; wherein if the number of current pulses is less than the low pulse threshold and the digital value is at the lower limit, the digital circuit is configured to maintain the digital value at the lower limit; wherein if the number of current pulses is greater than the pulse count range and the digital value is digital value is at an upper limit, the digital circuit is configurd to maintain the digital value at the upper limit; wherein if the number of current pulses is equal to or between the low pulse threshold and the high pulse threshold, the digital circuit is configured to maintain the digital value.

Example 18 includes a method of regulating voltage with a switching regulator, the method comprising: sensing an output voltage provided by the switching regulator; each time the output voltage drops below a low voltage threshold, providing a burst of one or more current pulses to raise the output voltage until the output voltage reaches a high voltage threshold, then discontinuing the burst of current pulses, wherein providing each current pulse in the burst includes setting the voltage regulator to a charge state until a current through an inductor reaches an upper current threshold, then setting the voltage regulator to a discharge state; and for each burst: counting a number of the one or more current pulses used to raise the output voltage from the low voltage threshold to the high voltage threshold; if the number of the one or more current pulses is less than a low pulse threshold and the upper current threshold is above a lower limit, reducing the upper current threshold; if the number of the one or more current pulses is less than the low pulse threshold and the upper current threshold is at the lower limit, maintaining the upper current threshold at the lower limit; if the number of the one or more current pulses is greater than a high pulse threshold and the upper current threshold is below the upper limit, increasing the upper current threshold; if the number of the one or more current pulses is greater than a high pulse threshold and the upper current threshold is at the upper limit, maintaining the upper current threshold at the upper limit; and if the number of the one or more current pulses is equal to or between the low pulse threshold and the high pulse threshold, maintaining the upper current threshold.

Example 19 includes the method of Example 18, wherein providing each current pulse in the burst includes, after switching the regulator to the discharge state, holding the regulator in the discharge state for a fixed period of time; wherein providing the burst of one or more current pulses includes, if the output voltage is less than the high voltage threshold at an end of the fixed period of time, providing another current pulse in the burst; and wherein discontinuing the burst of current pulses includes, if the output voltage is higher than the high voltage threshold at the end of the fixed period of time, discontinuing the burst by switching the regulator from the discharge state to an idle state.

Example 20 includes the method of Example 18, wherein providing each current pulse in the burst includes, after switching the regulator to the discharge state, holding the regulator in the discharge state until the current through the inductor reaches a lower current threshold; wherein providing the burst of one or more current pulses includes, if the output voltage is less than the high voltage threshold when the current through the inductor reaches the lower current threshold, providing another current pulse in the burst; and wherein discontinuing the burst of current pulses includes, if the output voltage is higher than the high voltage threshold when the current through the inductor reaches the lower current threshold, discontinuing the burst by switching the regulator from the discharge state to an idle state.

Example 21 includes a switching voltage regulator comprising: an inductor coupled in series between an input of the regulator and an output of the regulator; a first comparator configured to: indicate if the voltage at the output is above a high voltage threshold; and indicate if the voltage at the output is below a low voltage threshold; a current sensor configured to sense a current propagating through the inductor; a second comparator configured to indicate based on a signal from the current sensor, if the current propagating through the inductor is above an upper current threshold; a digital circuit configured to: determine based on an output from the first comparator, if the output voltage drops below a low voltage threshold; if the output voltage drops below the low voltage threshold, provide a burst of current pulses to raise the output voltage; provide to the second comparator, a digital value corresponding to the upper current threshold; during the burst of current pulses, determine based on an output from the second comparator, if the current through the inductor raises above the upper current threshold; provide each current pulse in the burst by: setting the regulator to a charge state; if the current through the inductor raises above the upper current threshold during the charge state, setting the regulator to a discharge state; during the burst of current pulses, determine based on an output from the first comparator, if the output voltage raises above a high voltage threshold; if the output voltage raises above the high voltage threshold, discontinue the burst; count a number of current pulses in the burst; compare the number of current pulses to at least one pulse count threshold; and adjust the upper current threshold based on the number of current pulses.

Example 22 includes the switching voltage regulator of Example 21, wherein the at least one pulse count threshold includes a low pulse threshold and a high pulse threshold, wherein adjust the upper current threshold includes: if the number of current pulses is less than the low pulse threshold and the digital value is above a lower limit, reduce the digital value corresponding to the upper current threshold; and if the number of current pulses is greater than the high pulse threshold and the digital value is below an upper limit, increase the digital value corresponding to the upper current threshold; wherein if the number of current pulses is less than the low pulse threshold and the digital value is at the lower limit, the digital circuit is configured to maintain the digital value at the lower limit; wherein if the number of current pulses is greater than the pulse count range and the digital value is digital value is at an upper limit, the digital circuit is configurd to maintain the digital value at the upper limit; wherein if the number of current pulses is equal to or between the low pulse threshold and the high pulse threshold, the digital circuit is configured to maintain the digital value.

Example 23 includes the voltage regulator of Example 22, wherein the digital circuit is configured to: monitor a length of time that the regulator is in the discharge state; if the output voltage is less than the high voltage threshold at an end of a fixed period of time, provide another current pulse in the burst; wherein discontinue the burst of current pulses includes discontinue the burst if the output voltage is higher than the high voltage threshold at an end of the fixed period of time.

Example 24 includes the voltage regulator of Example 22, wherein the digital circuit is configured to: determine if the current through the inductor reaches a lower current threshold during the discharge state; if the output voltage is less than the high voltage threshold when the current through the inductor reaches the lower current threshold, provide another current pulse in the burst; wherein discontinue the burst of current pulses includes discontinue the burst if the output voltage is higher than the high voltage threshold when the current through the inductor reaches the lower current threshold.

Example 25 includes the voltage regulator of any of Examples 21-24, wherein setting the regulator to a charge state includes setting one or more transistors into conductive or non-conductive states respectively such that the current through the inductor increases, wherein setting the regulator to a discharge state includes setting the one or more transistors into conductive or non-conductive states respectively such that the current through the inductor decreases.

Example 26 includes a system comprising: a power source; an electronic circuit; and a switching voltage regulator coupled between the power source and the electronic circuit, the switching voltage regulator configured to draw power from the power source and provide regulator power to the electronic circuit, the switching voltage regulator including: an inductor coupled in series between an input of the regulator and an output of the regulator; a first comparator configured to: indicate if the voltage at the output is above a high voltage threshold; and indicate if the voltage at the output is below a low voltage threshold; a current sensor configured to sense a current propagating through the inductor; a second comparator configured to indicate based on a signal from the current sensor, if the current propagating through the inductor is above an upper current threshold; a digital circuit configured to: each time the output voltage drops below a low voltage threshold, provide a burst of one or more current pulses to raise the output voltage until the output voltage reaches a high voltage threshold, then discontinue the burst of current pulses, wherein provide each current pulse in the burst includes set the voltage regulator to a charge state until a current through an inductor reaches an upper current threshold, then set the voltage regulator to a discharge state; and for each burst: count a number of the one or more current pulses used to raise the output voltage from the low voltage threshold to the high voltage threshold; if the number of the one or more current pulses is less than a low pulse threshold and the upper current threshold is above a lower limit, reduce the upper current threshold; if the number of the one or more current pulses is less than the low pulse threshold and the upper current threshold is at the lower limit, maintain the upper current threshold at the lower limit; if the number of the one or more current pulses is greater than a high pulse threshold and the upper current threshold is below the upper limit, increase the upper current threshold; if the number of the one or more current pulses is greater than a high pulse threshold and the upper current threshold is at the upper limit, maintain the upper current threshold at the upper limit; and if the number of the one or more current pulses is equal to or between the low pulse threshold and the high pulse threshold, maintain the upper current threshold.

Example 27 includes the system of Example 26, wherein provide each current pulse in the burst includes, after switching the regulator to the discharge state, hold the regulator in the discharge state for a fixed period of time; wherein provide the burst of one or more current pulses includes, if the output voltage is less than the high voltage threshold at an end of the fixed period of time, provide another current pulse in the burst; and wherein discontinue the burst of current pulses includes, if the output voltage is higher than the high voltage threshold at the end of the fixed period of time, discontinue the burst by switching the regulator from the discharge state to an idle state.

Example 28 includes the system of Example 26, wherein provide each current pulse in the burst includes, after switching the regulator to the discharge state, hold the regulator in the discharge state until the current through the inductor reaches a lower current threshold; wherein provide the burst of one or more current pulses includes, if the output voltage is less than the high voltage threshold when the current through the inductor reaches the lower current threshold, provide another current pulse in the burst; and wherein discontinue the burst of current pulses includes, if the output voltage is higher than the high voltage threshold when the current through the inductor reaches the lower current threshold, discontinue the burst by switching the regulator from the discharge state to an idle state.

What is claimed is:

1. A method of regulating voltage with a switching regulator, the method comprising:
   sensing an output voltage provided by the switching regulator;
   if the output voltage drops below a low voltage threshold, providing a burst of one or more current pulses to raise the output voltage, wherein providing each current pulse in the burst includes:
      setting the switching regulator to a charge state; and
      if a current through an inductor reaches an upper current threshold while the switching regulator is in the charge state, switching the switching regulator from the charge state to a discharge state;
   if the output voltage raises above a high voltage threshold during the burst, discontinuing the burst of current pulses;
   counting a number of the one or more current pulses in the burst;
   comparing the number of the one or more current pulses with at least one pulse threshold; and
   adjusting the upper current threshold based on the number of the one or more current pulses.

2. The method of claim 1, wherein providing each current pulse in the burst includes, after switching the switching regulator to the discharge state, holding the switching regulator in the discharge state for a fixed period of time;
   wherein providing the burst of one or more current pulses includes, if the output voltage is less than the high voltage threshold at an end of the fixed period of time, providing another current pulse in the burst; and
   wherein discontinuing the burst of current pulses includes, if the output voltage is higher than the high voltage threshold at the end of the fixed period of time, discontinuing the burst by switching the switching regulator from the discharge state to an idle state.

3. The method of claim 1, wherein providing each current pulse in the burst includes, after switching the switching regulator to the discharge state, holding the switching regulator in the discharge state until the current through the inductor reaches a lower current threshold;
   wherein providing the burst of one or more current pulses includes, if the output voltage is less than the high voltage threshold when the current through the inductor reaches the lower current threshold, providing another current pulse in the burst; and
   wherein discontinuing the burst of current pulses includes, if the output voltage is higher than the high voltage threshold when the current through the inductor reaches the lower current threshold, discontinuing the burst by switching the switching regulator from the discharge state to an idle state.

4. The method of claim 1, wherein setting the switching regulator to the charge state includes setting one or more transistors into conductive or non-conductive states respectively, such that the current through the inductor increases, and
   wherein switching the switching regulator from the charge state to the discharge state includes setting the one or more transistors into conductive or non-conductive states respectively, such that the current through the inductor decreases.

5. The method of claim 1, wherein switching the switching regulator from the discharge state to an idle state includes setting the one or more transistors into conductive or non-conductive states respectively such that the current through the inductor is substantially zero.

6. The method of claim 1, wherein the at least one pulse threshold includes a single threshold,
   wherein adjusting the upper current threshold includes:
      if the number of the one or more current pulses is less than the single threshold, reducing the upper current threshold; and
      if the number of the one or more current pulses is greater than the single threshold, increasing the upper current threshold;
   wherein if the number of the one or more current pulses is equal to the single threshold, maintaining the upper current threshold.

7. The method of claim 1, wherein the at least one pulse threshold includes a low pulse threshold and a high pulse threshold,
   wherein adjusting the upper current threshold includes:
      if the number of the one or more current pulses is less than a low pulse threshold, reducing the upper current threshold; and
      if the number of the one or more current pulses is greater than a high pulse threshold, increasing the upper current threshold;
   wherein if the number of the one or more current pulses is equal to or between the low pulse threshold and the high pulse threshold, maintaining the upper current threshold.

8. The method of claim 1, wherein the at least one pulse threshold includes a low pulse threshold and a high pulse threshold,
   wherein adjusting the upper current threshold includes:
      if the number of the one or more current pulses is less than a low pulse threshold and the upper current threshold is above a lower limit, reducing the upper current threshold; and
      if the number of the one or more current pulses is greater than a high pulse threshold and the upper current threshold is below an upper limit, increasing the upper current threshold;
   wherein if the number of the one or more current pulses is less than a low pulse threshold and the upper current threshold is at the lower limit, maintaining the upper current threshold at the lower limit; and
   wherein if the number of the one or more current pulses is greater than a high pulse threshold and the upper current threshold is at the upper limit, maintaining the upper current threshold at the upper limit;
   wherein if the number of the one or more current pulses is equal to or between the low pulse threshold and the high pulse threshold, maintaining the upper current threshold.

9. The method of claim 8, wherein the upper current threshold is based on a digital value such that raising the upper current threshold includes increasing the digital value and lowering the upper current threshold includes decreasing the digital value.

10. An integrated circuit chip for providing a regulated voltage at an output by charging and discharging an inductor, the integrated circuit chip comprising:

a first comparator configured to:
  indicate if the regulated voltage at the output is above a high voltage threshold; and indicate if the regulated voltage at the output is below a low voltage threshold;
a current sensor configured to sense a current propagating through the inductor;
a second comparator configured to indicate based on a signal from the current sensor, if the current propagating through the inductor is above an upper current threshold;
a digital circuit configured to:
  determine based on an output from the first comparator, if the output voltage drops below a low voltage threshold;
  if the output voltage drops below the low voltage threshold, provide a burst of current pulses to raise the output voltage;
  provide to the second comparator, a digital value corresponding to the upper current threshold;
  during the burst of current pulses, determine based on an output from the second comparator, if the current through the inductor raises above the upper current threshold;
  provide each current pulse in the burst by:
    setting a regulator to a charge state;
    if the current through the inductor raises above the upper current threshold during the charge state, setting the regulator to a discharge state;
  during the burst of current pulses, determine based on an output from the first comparator, if the output voltage raises above a high voltage threshold;
  if the output voltage raises above the high voltage threshold, discontinue the burst;
  count a number of current pulses in the burst;
  compare the number of current pulses to at least one pulse count threshold; and
  adjust the upper current threshold based on the number of current pulses.

11. The integrated circuit chip of claim 10, comprising a digital to analog converter configured to convert the digital value to a voltage,
  wherein the second comparator is configured to compare the voltage to a voltage from the current sensor, wherein the voltage from the current sensor corresponds to the current through the inductor.

12. The integrated circuit chip of claim 10, wherein the digital circuit is configured to:
  monitor a length of time that the regulator is in the discharge state;
  if the output voltage is less than the high voltage threshold at an end of a fixed period of time, provide another current pulse in the burst;
  wherein the discontinue the burst of current pulses includes discontinue the burst if the output voltage is higher than the high voltage threshold at an end of the fixed period of time.

13. The integrated circuit chip of claim 10, wherein the digital circuit is configured to:
  determine if the current through the inductor reaches a lower current threshold during the discharge state;
  if the output voltage is less than the high voltage threshold when the current through the inductor reaches the lower current threshold, provide another current pulse in the burst;
  wherein the discontinue the burst of current pulses includes discontinue the burst if the output voltage is higher than the high voltage threshold when the current through the inductor reaches the lower current threshold.

14. The integrated circuit chip of claim 10, wherein setting the regulator to a charge state includes setting one or more transistors into conductive or non-conductive states respectively such that the current through the inductor increases,
  wherein setting the regulator to a discharge state includes setting the one or more transistors into conductive or non-conductive states respectively such that the current through the inductor decreases.

15. The integrated circuit chip of claim 10, wherein the at least one pulse count threshold consists of a single threshold,
  wherein the adjust the upper current threshold includes:
    if the number of current pulses is less than the single threshold, reduce the digital value corresponding to the upper current threshold; and
    if the number of current pulses is greater than the single threshold, increase the digital value corresponding to the upper current threshold,
  wherein if the number of current pulses is equal to the single threshold, the digital circuit is configured to maintain the digital value corresponding to the upper current threshold.

16. The integrated circuit chip of claim 10, wherein the at least one pulse count threshold includes a low pulse threshold and a high pulse threshold,
  wherein the adjust the upper current threshold includes:
    if the number of current pulses is less than the low pulse threshold, reduce the digital value corresponding to the upper current threshold; and
    if the number of current pulses is greater than the high pulse threshold, increase the digital value corresponding to the upper current threshold,
  wherein if the number of current pulses is equal to or between the low pulse threshold and the high pulse threshold, the digital circuit is configured to maintain the digital value corresponding to the upper current threshold.

17. The integrated circuit chip of claim 10, wherein the at least one pulse count threshold includes a low pulse threshold and a high pulse threshold,
  wherein the adjust the upper current threshold includes:
    if the number of current pulses is less than the low pulse threshold and the digital value is above a lower limit, reduce the digital value corresponding to the upper current threshold; and
    if the number of current pulses is greater than the high pulse threshold and the digital value is below an upper limit, increase the digital value corresponding to the upper current threshold;
  wherein if the number of current pulses is less than the low pulse threshold and the digital value is at the lower limit, the digital circuit is configured to maintain the digital value at the lower limit;
  wherein if the number of current pulses is greater than the pulse count range and the digital value is digital value is at an upper limit, the digital circuit is configurd to maintain the digital value at the upper limit;
  wherein if the number of current pulses is equal to or between the low pulse threshold and the high pulse threshold, the digital circuit is configured to maintain the digital value.

18. A method of regulating voltage with a switching regulator, the method comprising:

sensing an output voltage provided by the switching regulator;

each time the output voltage drops below a low voltage threshold, providing a burst of one or more current pulses to raise the output voltage until the output voltage reaches a high voltage threshold, then discontinuing the burst of current pulses, wherein providing each current pulse in the burst includes setting the voltageswitching regulator to a charge state until a current through an inductor reaches an upper current threshold, then setting the voltage regulator to a discharge state; and for each burst:
counting a number of the one or more current pulses used to raise the output voltage from the low voltage threshold to the high voltage threshold;
if the number of the one or more current pulses is less than a low pulse threshold and the upper current threshold is above a lower limit, reducing the upper current threshold;
if the number of the one or more current pulses is less than the low pulse threshold and the upper current threshold is at the lower limit, maintaining the upper current threshold at the lower limit;
if the number of the one or more current pulses is greater than a high pulse threshold and the upper current threshold is below the upper limit, increasing the upper current threshold;
if the number of the one or more current pulses is greater than a high pulse threshold and the upper current threshold is at the upper limit, maintaining the upper current threshold at the upper limit; and
if the number of the one or more current pulses is equal to or between the low pulse threshold and the high pulse threshold, maintaining the upper current threshold.

19. The method of claim 18, wherein providing each current pulse in the burst includes, after switching the switching regulator to the discharge state, holding the switching regulator in the discharge state for a fixed period of time;
wherein providing the burst of one or more current pulses includes, if the output voltage is less than the high voltage threshold at an end of the fixed period of time, providing another current pulse in the burst; and
wherein discontinuing the burst of current pulses includes, if the output voltage is higher than the high voltage threshold at the end of the fixed period of time, discontinuing the burst by switching the switching regulator from the discharge state to an idle state.

20. The method of claim 18, wherein providing each current pulse in the burst includes, after switching the switching regulator to the discharge state, holding the switching regulator in the discharge state until the current through the inductor reaches a lower current threshold;
wherein providing the burst of one or more current pulses includes, if the output voltage is less than the high voltage threshold when the current through the inductor reaches the lower current threshold, providing another current pulse in the burst; and
wherein discontinuing the burst of current pulses includes, if the output voltage is higher than the high voltage threshold when the current through the inductor reaches the lower current threshold, discontinuing the burst by switching the switching regulator from the discharge state to an idle state.

21. A switching voltage regulator comprising:
an inductor coupled in series between an input of the switching voltage regulator and an output of the switching voltage regulator;
a first comparator configured to:
indicate if a voltage at the output is above a high voltage threshold;
and indicate if the voltage at the output is below a low voltage threshold;
a current sensor configured to sense a current propagating through the inductor;
a second comparator configured to indicate based on a signal from the current sensor, if the current propagating through the inductor is above an upper current threshold;
a digital circuit configured to:
determine based on an output from the first comparator, if the output voltage drops below a low voltage threshold;
if the output voltage drops below the low voltage threshold, provide a burst of current pulses to raise the output voltage;
provide to the second comparator, a digital value corresponding to the upper current threshold;
during the burst of current pulses, determine based on an output from the second comparator, if the current through the inductor raises above the upper current threshold;
provide each current pulse in the burst by:
setting the switching voltage regulator to a charge state;
if the current through the inductor raises above the upper current threshold during the charge state, setting the switching voltage regulator to a discharge state;
during the burst of current pulses, determine based on an output from the first comparator, if the output voltage raises above a high voltage threshold;
if the output voltage raises above the high voltage threshold, discontinue the burst;
count a number of current pulses in the burst;
compare the number of current pulses to at least one pulse count threshold; and
adjust the upper current threshold based on the number of current pulses.

22. The switching voltage regulator of claim 21, wherein the at least one pulse count threshold includes a low pulse threshold and a high pulse threshold,
wherein adjust the upper current threshold includes:
if the number of current pulses is less than the low pulse threshold and the digital value is above a lower limit, reduce the digital value corresponding to the upper current threshold; and
if the number of current pulses is greater than the high pulse threshold and the digital value is below an upper limit, increase the digital value corresponding to the upper current threshold;
wherein if the number of current pulses is less than the low pulse threshold and the digital value is at the lower limit, the digital circuit is configured to maintain the digital value at the lower limit;
wherein if the number of current pulses is greater than the pulse count range and the digital value is digital value is at an upper limit, the digital circuit is configured to maintain the digital value at the upper limit;

wherein if the number of current pulses is equal to or between the low pulse threshold and the high pulse threshold, the digital circuit is configured to maintain the digital value.

23. The switching voltage regulator of claim 22, wherein the digital circuit is configured to:
monitor a length of time that the switching voltage regulator is in the discharge state;
if the output voltage is less than the high voltage threshold at an end of a fixed period of time, provide another current pulse in the burst;
wherein discontinue the burst of current pulses includes discontinue the burst if the output voltage is higher than the high voltage threshold at an end of the fixed period of time.

24. The switching voltage regulator of claim 22, wherein the digital circuit is configured to:
determine if the current through the inductor reaches a lower current threshold during the discharge state;
if the output voltage is less than the high voltage threshold when the current through the inductor reaches the lower current threshold, provide another current pulse in the burst;
wherein the discontinue the burst of current pulses includes discontinue the burst if the output voltage is higher than the high voltage threshold when the current through the inductor reaches the lower current threshold.

25. The switching voltage regulator of claim 21, wherein setting the switching voltage regulator to a charge state includes setting one or more transistors into conductive or non-conductive states respectively such that the current through the inductor increases,
wherein setting the switching voltage regulator to a discharge state includes setting the one or more transistors into conductive or non-conductive states respectively such that the current through the inductor decreases.

26. A system comprising:
a power source;
an electronic circuit; and
a switching voltage regulator coupled between the power source and the electronic circuit, the switching voltage regulator configured to draw power from the power source and provide regulator power to the electronic circuit, the switching voltage regulator including:
an inductor coupled in series between an input of the switching voltage regulator and an output of the switching voltage regulator;
a first comparator configured to:
indicate if the voltage at the output is above a high voltage threshold; and
indicate if the voltage at the output is below a low voltage threshold;
a current sensor configured to sense a current propagating through the inductor;
a second comparator configured to indicate based on a signal from the current sensor, if the current propagating through the inductor is above an upper current threshold;
a digital circuit configured to:
each time the output voltage drops below a low voltage threshold, provide a burst of one or more current pulses to raise the output voltage until the output voltage reaches a high voltage threshold, then discontinue the burst of current pulses, wherein provide each current pulse in the burst includes set the switching voltage regulator to a charge state until a current through an inductor reaches an upper current threshold, then set the switching voltage regulator to a discharge state; and
for each burst:
count a number of the one or more current pulses used to raise the output voltage from the low voltage threshold to the high voltage threshold;
if the number of the one or more current pulses is less than a low pulse threshold and the upper current threshold is above a lower limit, reduce the upper current threshold;
if the number of the one or more current pulses is less than the low pulse threshold and the upper current threshold is at the lower limit, maintain the upper current threshold at the lower limit;
if the number of the one or more current pulses is greater than a high pulse threshold and the upper current threshold is below the upper limit, increase the upper current threshold;
if the number of the one or more current pulses is greater than a high pulse threshold and the upper current threshold is at the upper limit, maintain the upper current threshold at the upper limit; and
if the number of the one or more current pulses is equal to or between the low pulse threshold and the high pulse threshold, maintain the upper current threshold.

27. The system of claim 26, wherein the provide each current pulse in the burst includes, after switching the switching voltage regulator to the discharge state, hold the switching voltage regulator in the discharge state for a fixed period of time;
wherein provide the burst of one or more current pulses includes, if the output voltage is less than the high voltage threshold at an end of the fixed period of time, provide another current pulse in the burst; and
wherein the discontinue the burst of current pulses includes, if the output voltage is higher than the high voltage threshold at the end of the fixed period of time, discontinue the burst by switching the switching voltage regulator from the discharge state to an idle state.

28. The system of claim 26, wherein the provide each current pulse in the burst includes, after switching the switching voltage regulator to the discharge state, hold the switching voltage regulator in the discharge state until the current through the inductor reaches a lower current threshold;
wherein the provide the burst of one or more current pulses includes, if the output voltage is less than the high voltage threshold when the current through the inductor reaches the lower current threshold, provide another current pulse in the burst; and
wherein the discontinue the burst of current pulses includes, if the output voltage is higher than the high voltage threshold when the current through the inductor reaches the lower current threshold, discontinue the burst by switching the switching voltage regulator from the discharge state to an idle state.

\* \* \* \* \*

UNITED STATES PATENT AND TRADEMARK OFFICE
CERTIFICATE OF CORRECTION

PATENT NO. : 9,515,556 B2  
APPLICATION NO. : 14/543047  
DATED : December 6, 2016  
INVENTOR(S) : Yang et al.

Page 1 of 1

It is certified that error appears in the above-identified patent and that said Letters Patent is hereby corrected as shown below:

In the Claims

At Claim 17, Column 22, Line 59, replace "circuit is configurd to" with --circuit is configured to--.

At Claim 18, Column 23, Line 9, replace "voltagcswitching regulator" with --switching regulator--.

At Claim 18, Column 23, Line 11, replace "voltage regulator" with --switching regulator--.

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*